UNITED STATES PATENT OFFICE.

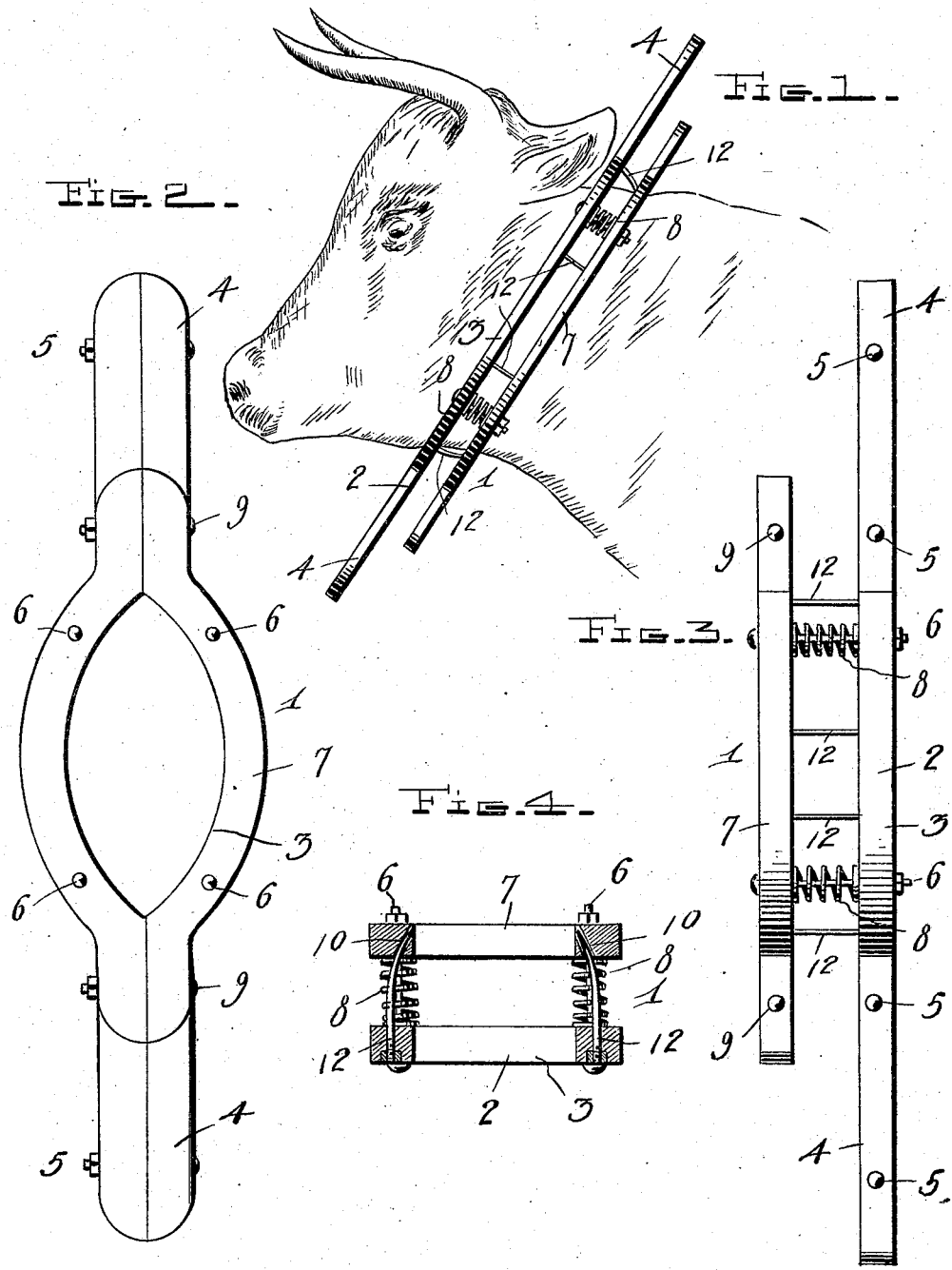

PERCY W. WHELDEN, OF NORCATUR, KANSAS.

ANIMAL-YOKE.

No. 854,973. Specification of Letters Patent. Patented May 28, 1907.

Application filed August 9, 1906. Serial No. 329,922.

*To all whom it may concern:*

Be it known that I, PERCY W. WHELDEN, a citizen of the United States, residing at Norcatur, in the county of Decatur and State of Kansas, have invented certain new and useful Improvements in Animal-Yokes; and I do declare the following to be a full, clear, and exact description of the invention, such as will enable others skilled in the art to which it appertains to make and use the same.

This invention relates to improvements in animal yokes.

The object of the invention is to provide a yoke or poke for animals to prevent the latter from jumping or knocking down fences.

A further object is to provide a yoke which will be simple, and strong in construction, efficient and reliable in operation and well adapted for the purpose for which it is designed.

With these and other objects in view, the invention consists of certain novel features of construction, combination and arrangement of parts, as will be more fully described and particularly pointed out in the appended claims.

In the accompanying drawings,—Figure 1 is a side view of the yoke showing the same applied to the neck of an animal; Fig. 2 is an enlarged front view of the yoke; Fig. 3 is a side view of the same; and Fig. 4 is a cross sectional view through the yoke taken on a line with two of the prods.

Referring to the drawings, 1 denotes the yoke which consists of an outer collar 2 having an elliptically shaped neck engaging portion 3, the ends of which are extended to form arms 4, that constitute obstructions to the passage of an animal through a fence. The collar 2 is preferably formed of two longitudinal half sections bolted together at their opposite ends, as shown at 5.

Connected to the collar 2 by bolts 6 is an inner collar 7, which is similar in shape and construction to the outer collar 2 except that the arms 4 are omitted. The collar 7 is spaced from the outer collar and yieldingly held in position by means of coil springs 8 which are arranged on the bolts 6 between said collars, as shown. The collar 7 is preferably formed of two longitudinally disposed half sections which are bolted together at their ends by bolts 9. Secured to the outer collar 2 and projecting inwardly from the same through inclined or curved passages 10 in the inner side and edge of the collar 7 are curved or inclined prods 12 which when the outer section is forced inwardly by pressure against a fence or other obstruction will cause the prods 12 to project through passages 10 and to prick the neck of the animal, thus causing it to desist from further attempts to press forward. By providing a plurality of prods arranged as herein described, slight pressure at any point on the outer collar will cause one or more of said prods to prick the animal.

A yoke constructed as herein shown and described will not only prevent the destruction of fences or buildings by the animals wearing the same, but when applied to the neck of a cow will prevent the animal from sucking or milking herself.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having described my invention, what I claim as new and desire to secure by Letters-Patent, is,—

A yoke comprising an outer collar, an inner collar provided with curved orifices projecting through a corner of the edge thereof, means to hold the collars yieldingly spaced, and inward curved prods carried by the outer collar and adapted to project through the orifices of the inner collar.

In testimony whereof I have hereunto set my hand in presence of two subscribing witnesses.

PERCY W. WHELDEN.

Witnesses:
C. F. MILLER,
BERT MURPHY.